Figure 1:
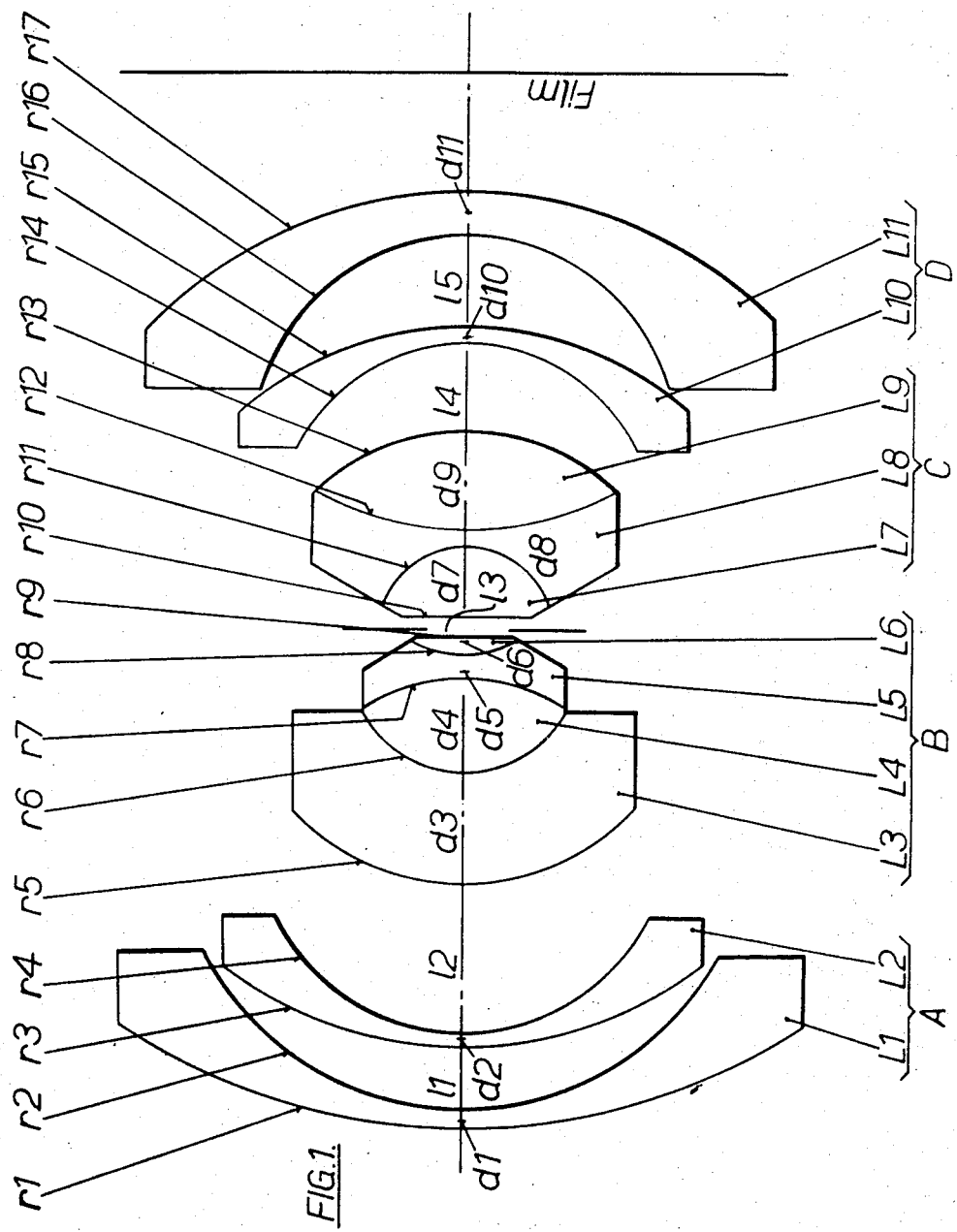

[11] 3,630,600

[72] Inventor Ludwig Bertele
     Heerbrugg, St. Gall, Switzerland
[21] Appl. No. 20,891
[22] Filed Mar. 19, 1970
[45] Patented Dec. 28, 1971
[32] Priority Apr. 14, 1967
[33] Switzerland
[31] 5413/67
     Continuation-in-part of application Ser. No.
     719,432, Apr. 8, 1968, now abandoned.
     This application Mar. 19, 1970, Ser. No.
     20,891

[54] WIDE ANGLE LENS
     5 Claims, 3 Drawing Figs.
[52] U.S. Cl. .................................................. 350/215,
     350/220
[51] Int. Cl. .................................................. G02b 9/62,
     G02b 9/34
[50] Field of Search ........................................... 350/214,
     215, 220

[56] References Cited
     UNITED STATES PATENTS
     3,154,628  10/1964  Bertele .......................... 350/214 X
     3,447,861  6/1969  Schlegel ........................ 350/220

*Primary Examiner*—David Schonberg
*Assistant Examiner*—Paul A. Sacher
*Attorney*—Baldwin, Wight & Brown ABSTRACT: Wide angle lens having angle of view ±60° or more comprises two converging lens components, with at least one cemented surface between lens elements therein, separated by a diaphragm, and two diverging menisci enclosing said components and diaphragm, the menisci concave facing the diaphragm. The convex outer surface of the component on the image side of the diaphragm faces away from the latter and has greater curvature than the preceding cemented surface. The convex side of said preceding cemented surface faces the diaphragm and has a lower refractive index on its diaphragm side than on its image side.

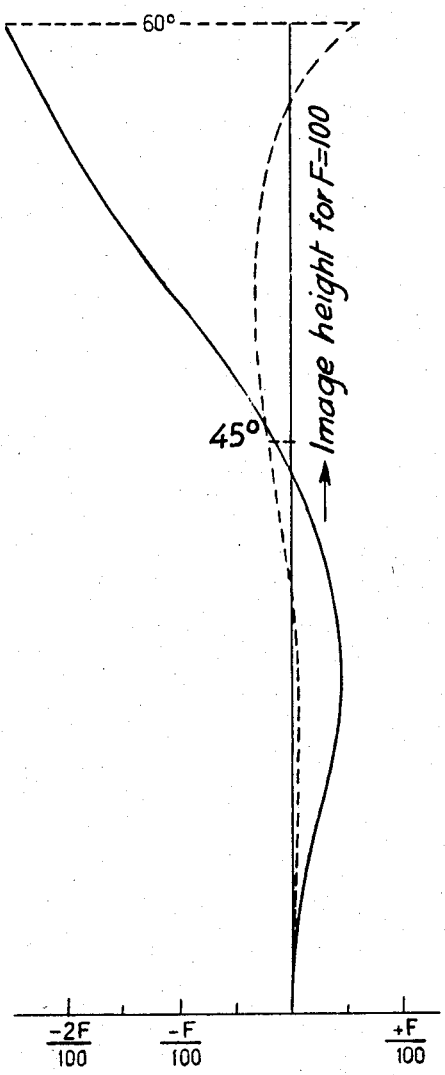 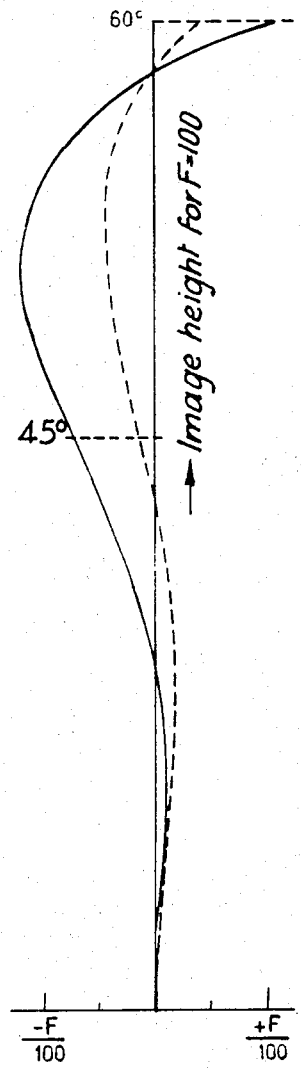

WIDE ANGLE LENS

This Application is a Continuation-in-Part of my Application No. 719,432 filed Apr. 8, 1968, and now abandoned.

This invention relates to wide-angle objective lenses, and concerns such a lens of the type which has an angular field of ±60° or more, largely free of distortion, the lens including two converging lens elements, each of which is composed of a plurality of individual lenses, the elements being separated by a diaphragm, and which, both on the object side and on the image side, are enclosed by at least two diverging menisci, the concave sides of which face the diaphragm.

According to this invention, in a wide-angle lens of the type described, the outer convex surface of the converging lens element situated behind and facing away from the diaphragm has greater curvature than the preceding cemented surface which has its convex side facing the diaphragm, with a lower refractive index on the diaphragm side than on the image side.

A lens according to the invention is shown in FIG. 1 of the accompanying drawings.

FIG. 2 shows the astigmatic image curves, particularly the sagittal curve, in the case of a known lens, while by way of comparison FIG. 3 shows the corresponding curves for a lens according to the invention. The solid line is the sagittal and the broken line the meridianal image curve.

The axial distance from the cemented surface, which is in the converging lens element and situated in front of the diaphragm and has its concave side facing the latter, with a higher refractive index on the diaphragm side than on the object side (see $r_8$ in FIG. 1), to the cemented surface which in the converging lens element is situated behind the diaphragm and has its convex side facing the latter, with a smaller refractive index on the diaphragm side than on the image side (see $r_{12}$ in FIG. 1), is greater than 0.25 F and smaller than 0.37 F.

Known wide-angle objective lenses are found to lack sharpness of definition at the edges of the image, since the sagittal image curve is considerably curved towards the lens with an angle of view above ±45°, even when at smaller angles of view it faces away from the lens.

Exhaustive investigations have shown that this aberration can be reduced according to the invention which provides a wide-angle lens in which the cemented surface, which is disposed in the converging lens element situated on the image side of the diaphragm, has its convex surface facing the latter, has a smaller refractive index on the diaphragm side than on the image side ($r_{12}$), is displaced in the direction of the image to such a considerable extent that it is further from the diaphragm than the cemented surface having its concave side facing the diaphragm, and has a radius of curvature which is greater than that of the following convex outer surface. This measure, however, has a considerable effect on the chromatic aberrations for the different angles of view. It has nevertheless been found that these aberrations can be satisfactorily corrected if the distance between the aforesaid cemented surface ($r_{12}$) and a cemented surface, which in the converging lens element is situated in front of the diaphragm and has its concave side facing the latter, with a higher refractive index on the diaphragm side than on the object side ($r_8$), ranges from 0.25 F to 0.37 F.

With such a wide angle of view it is necessary to consider the optical path over the full width in the sagittal section also. It is then found that it is advantageous for the focal length of the diverging lens element (A) situated on the object side to be made greater than −1.08 F and smaller than −1.60 F. The focal length of the diverging lens element (D) situated on the image side should moreover be greater than −0.83 F and smaller than −1.05 F. It is in addition preferable for the menisci to be given a less sharp curvature than the known lens, so that the sum of the radii of curvature of the concavities in the menisci on the object side exceeds 1.12 F. The size of the partial focal lengths and of the sum of the aforesaid radii of curvature depends on the permissible overall lengths of the lens and the consequent diameter of the diverging meniscus group.

It is also preferable that the numerical sum of the radii of curvature of the outer surfaces, facing away from the diaphragm, of the two converging elements is made greater than 1.0 F and smaller than 1.50 F.

In connection with correction of distortion it has been found advantageous to keep the quotient of the radius of curvature of the first and last surfaces of the lens between 1.10 and 2.20.

A cemented surface in the converging lens element on the image side has its concave surface facing the diaphragm ($r_{11}$) and the refractive index is graduated so that it is smaller on the side facing the diaphragm than on the side facing away from the latter. Spherical aberration is thereby eliminated in known manner. The same effect can also be achieved with an uncemented surface pair separated by a small air space and with any desired graduation of the refractive index, if the two surfaces have different curvatures. The same is also true of the corresponding cemented surface, likewise having its concave side facing the diaphragm ($r_6$), in the converging lens element on the object side, with a smaller refractive index on the diaphragm side than on the object side.

As compared with known lenses, the lateral chromatic aberration at the edge of the image is considerably reduced by the movement towards the image of the previously mentioned cemented surface ($r_{12}$), having its convex side facing the diaphragm, in the converging lens element on the image side. The measures described also permit enlargement of the diaphragm space, which is advantageous in respect of the fitting of an iris diaphragm and of a shutter diaphragm.

Three examples of lenses according to this invention will now be described with reference to FIG. 1 of the accompanying drawings. The lenses have a focal length F=100 mm. an aperture ratio of 1:5.6, and an angle of view of 120°. The two converging lens elements are designated by B and C and the two meniscus groups enclosing them are designated by A and D. The lens element B is composed of four members $L_3$–$L_6$, at least $L_4$ and $L_5$ and also $L_5$ and $L_6$ being cemented. The lens element C consists of three members $L_7$–$L_9$ and are shaped and disposed as described above.

The values of the radius of curvature of the cemented surface which has its convex side facing the diaphragm ($r_{12}$) and that of the following outer surface ($r_{13}$), as well as the axial distance between the surfaces $r_8$ and $r_{12}$, are as follows:

| Example | $r_{12}$ | $r_{13}$ | $r_8-r_{12}$ |
|---|---|---|---|
| 1 | 0.815F | −0.568F | 0.306F |
| 2 | 0.995F | −0.668F | 0.36F |
| 3 | 0.90F | −0.576F | 0.259F |

In the tables set out below, the constructional data are given for three lenses constructed according to the invention. Of course, a similar correction condition can also be achieved with data which are between the values given.

If one or the other of the lens elements contains an air layer which does not substantially affect the total power of the lens, the lens element subdivided in this manner is to be regarded in accordance with the invention as a single element. Similarly lens element A and/or lens element D may consist of more than two menisci.

The radii of curvature of the lens surfaces are designated by $r$, the thicknesses of the lenses by $d$, the air spaces by $l$, the refractive index for the helium line by $n_d$, and the Abbe figures by $\nu d$.

EXAMPLE 1

| | | | $n_d$ | $\nu_d$ |
|---|---|---|---|---|
| $L_1$ | $r_1=+163.25$ | | | |
| | | $d_1=4.53$ | 1.51680 | 64.2 |
| | $r_2=+74.41$ | | | |
| | | $l_1=14.14$ | | |
| | $r_3=+99.80$ | | | |
| $L_2$ | | $d_2=3.96$ | 1.52054 | 69.7 |
| | $r_4=+53.18$ | | | |

EXAMPLE 2 (continued)

| | | | $n_d$ | $v_d$ |
|---|---|---|---|---|
| | $r_5=+62.21$ | | | |
| $L_3$ | | $l_2=36.17$ | | |
| | $r_6=+29.33$ | $d_3=26.82$ | 1.74400 | 44.8 |
| $L_4$ | | $d_4=22.80$ | 1.65100 | 41.9 |
| | $r_7=-55.22$ | | | |
| $L_5$ | | $d_5=6.80$ | 1.59308 | 35.7 |
| | $r_8=+31.80$ | | | |
| $L_6$ | | $d_6=4.30$ | 1.64350 | 47.8 |
| | $r_9=+926.20$ | | | |
| | $r_{10}=-1385.90$ | $l_3=3.90$ | | |
| $L_7$ | | $d_7=18.63$ | 1.55232 | 63.5 |
| | $r_{11}=-22.00$ | | | |
| $L_8$ | | $d_8=3.78$ | 1.63636 | 35.3 |
| | $r_{12}=+81.47$ | | | |
| $L_9$ | | $d_9=22.40$ | 1.74300 | 33.3 |
| | $r_{13}=-58.62$ | | | |
| | $r_{14}=-48.76$ | $l_4=22.91$ | | |
| $L_{10}$ | | $d_{10}=3.96$ | 1.53172 | 48.8 |
| | $r_{15}=-83.50$ | | | |
| | $r_{16}=-51.42$ | $l_5=22.29$ | | |
| $L_{11}$ | | $d_{11}=10.30$ | 1.64050 | 60.1 |
| | $r_{17}=-111.90$ | | | |

$s_0'=28.96$

EXAMPLE 2

| | | | $n_d$ | $v_d$ |
|---|---|---|---|---|
| | $r_1=+156.40$ | | | |
| $L_1$ | | $d_1=3.80$ | 1.51680 | 64.2 |
| | $r_2=+80.54$ | | | |
| | $r_3=+113.70$ | $l_1=15.20$ | | |
| $L_2$ | | $d_2=3.80$ | 1.52054 | 69.7 |
| | $r_4=+55.43$ | | | |
| | $r_5=+64.62$ | $l_2=39.80$ | | |
| $L_3$ | | $d_3=33.10$ | 1.74400 | 44.8 |
| | $r_6=+28.07$ | | | |
| $L_4$ | | $d_4=18.00$ | 1.65100 | 42.2 |
| | $r_7=-53.06$ | | | |
| $L_5$ | | $d_5=4.70$ | 1.59308 | 35.7 |
| | $r_8=+37.90$ | | | |
| $L_6$ | | $d_6=3.80$ | 1.64328 | 48.0 |
| | $r_9=+833.00$ | | | |
| | $r_{10}=-560.00$ | $l_3=4.70$ | | |
| $L_7$ | | $d_7=25.10$ | 1.56873 | 63.1 |
| | $r_{11}=-23.29$ | | | |
| $L_8$ | | $d_8=2.35$ | 1.63636 | 35.3 |
| | $r_{12}=+99.50$ | | | |
| $L_9$ | | $d_9=21.80$ | 1.74300 | 33.3 |
| | $r_{13}=-66.80$ | | | |
| | $r_{14}=-58.65$ | $l_4=30.80$ | | |
| $L_{10}$ | | $d_{10}=3.80$ | 1.52542 | 64.7 |
| | $r_{15}=-99.50$ | | | |
| | $r_{16}=-58.10$ | $l_5=26.50$ | | |
| $L_{11}$ | | $d_{11}=4.70$ | 1.52542 | 64.7 |
| | $r_{17}=-126.00$ | | | |

$s_0'=24.05$

EXAMPLE 3

| | | | $n_d$ | $v_d$ |
|---|---|---|---|---|
| | $r_1=+163.25$ | | | |
| $L_1$ | | $d_1=4.53$ | 1.51680 | 64.2 |
| | $r_2=+74.41$ | | | |
| | $r_3=+99.80$ | $l_1=14.14$ | | |
| $L_2$ | | $d_2=3.96$ | 1.52054 | 69.7 |
| | $r_4=+53.18$ | | | |
| | $r_5=+62.21$ | $l_2=36.17$ | | |
| $L_3$ | | $d_3=26.82$ | 1.74400 | 44.8 |
| | $r_6=+29.33$ | | | |
| $L_4$ | | $d_4=22.80$ | 1.65100 | 41.9 |
| | $r_7=-55.22$ | | | |
| $L_5$ | | $d_5=6.80$ | 1.59308 | 35.7 |
| | $r_8=+32.50$ | | | |
| $L_6$ | | $d_6=3.00$ | 1.64350 | 47.8 |
| | $r_9=+973.65$ | | | |
| | $r_{10}=-1385.90$ | $l_3=3.90$ | | |
| $L_7$ | | $d_7=18.00$ | 1.55232 | 63.5 |
| | $r_{11}=-21.78$ | | | |
| $L_8$ | | $d_8=1.00$ | 1.63636 | 35.3 |
| | $r_{12}=+90.00$ | | | |
| $L_9$ | | $d_9=25.80$ | 1.74300 | 33.3 |
| | $r_{13}=-57.55$ | | | |
| | $r_{14}=-48.76$ | $l_4=22.91$ | | |
| $L_{10}$ | | $d_{10}=3.96$ | 1.53375 | 55.3 |
| | $r_{15}=-83.25$ | | | |
| | $r_{16}=-51.42$ | $l_5=21.00$ | | |
| $L_{11}$ | | $d_{11}=10.30$ | 1.64050 | 60.1 |
| | $r_{17}=-111.90$ | | | |

$s_0'=30.8$  $F=100.0$

I claim:

1. A photogrammetric objective consisting essentially of six lens units separated by air spaces, and a diaphragm positioned between the third and fourth lens units, the said lens units, beginning at the region of greater beam width, having the following arrangement and configurations:
   a. a first lens unit ($L_1$) and a second lens unit ($L_2$) which are both constituted by diverging meniscuses convex in the direction of the object and which are separated by an air space having the shape of a converging meniscus;
   b. a third lens unit (B) which is a converging unit composed of four individual lenses cemented together, these being (i) a diverging lens ($L_3$) both surfaces convex in the direction of the object, (ii) a biconvex converging lens ($L_4$), (iii) a biconcave diverging lens ($L_5$) and (iv) a converging lens ($L_6$) which has its surface of substantially greater radius of curvature on the diaphragm side, its other surface being convex toward the object side, and which has a higher refractive index than the preceding diverging lens ($L_5$);
   c. a fourth lens unit (C) which is a converging unit disposed beyond the diaphragm and composed of three individual lenses cemented together, these being (i) a convex lens ($L_7$) which has its surface of a substantially greater radius of curvature on the diaphragm side and its other surface being convex on the image side, (ii) a biconcave lens ($L_8$) and (iii) a biconvex lens ($L_9$) which has a higher refractive index than the preceding diverging lens ($L_8$) the cemented surface $r_{12}$) between the biconcave lens ($L_{(90)8}$) and the biconvex biconvex lens ($L_9$) having a radius of curvature greater than the outer surface ($r_{13}$) on the image side; and
   d. a fifth lens unit ($L_{10}$) and a sixth lens unit ($L_{11}$) which are constituted by diverging meniscuses convex in the direction of the image and which are separated by an air space having the shape of a converging meniscus.

2. A photogrammetric objective as claimed in claim 1, wherein the distance between that cemented surface ($r_8$) which is provided within the said third lens unit (B), is closest to the diaphragm, and is concave in the direction of the diaphragm, and that cemented surface ($r_{12}$) which is provided within the said fourth lens unit (C), and is convex in the direction of the diaphragm, is greater than 0.25 F and less than 0.37 F.

3. A photogrammetric objective according to claim 1 in which the radii of curvature r of the lens surfaces, the lens thicknesses d, the air spaces l, the refractive indices for the helium line $n_d$, and the Abbe figures $v_d$ are substantially as set forth in the following table:

| | | | $n_d$ | $v_d$ |
|---|---|---|---|---|
| | $r_1=+163.25$ | | | |
| $L_1$ | | $d_1=4.53$ | 1.51680 | 64.2 |
| | $r_2=+74.41$ | | | |
| | $r_3=+99.80$ | $l_1=14.14$ | | |
| $L_2$ | | $d_2=3.96$ | 1.52054 | 69.7 |

|  | | | $n_d$ | $v_d$ |
|---|---|---|---|---|
| | $r_4=+53.18$ | | | |
| | | $l_2=36.17$ | | |
| $L_3$ | $r_5=+62.21$ | | | |
| | | $d_3=26.82$ | 1.74400 | 44.8 |
| | $r_6=+29.35$ | | | |
| $L_4$ | | $d_4=22.80$ | 1.65100 | 41.9 |
| | $r_7=-55.22$ | | | |
| $L_5$ | | $d_5=6.80$ | 1.59308 | 35.7 |
| | $r_8=+31.80$ | | | |
| $L_6$ | | $d_6=4.30$ | 1.64350 | 47.8 |
| | $r_9=+926.20$ | | | |
| | | $l_3=3.90$ | | |
| | $r_{10}=-1385.90$ | | | |
| $L_7$ | | $d_7=18.63$ | 1.55232 | 63.5 |
| | $r_{11}=-22.00$ | | | |
| $L_8$ | | $d_8=3.78$ | 1.63636 | 35.3 |
| | $r_{12}=+81.47$ | | | |
| $L_9$ | | $d_9=22.40$ | 1.74300 | 33.3 |
| | $r_{13}=-58.62$ | | | |
| | | $l_4=22.91$ | | |
| | $r_{14}=-48.76$ | | | |
| $L_{10}$ | | $d_{10}=3.96$ | 1.53172 | 48.8 |
| | $r_{15}=-83.50$ | | | |
| | | $l_5=22.29$ | | |
| | $r_{16}=-51.42$ | | | |
| $L_{11}$ | | $d_{11}=10.30$ | 1.64050 | 60.1 |
| | $r_{17}=-111.90$ | | | |

$s_0'=28.96$

4. A photogrammetric objective according to claim 1 in which the radii of curvature $r$ of the lens surfaces, the lens thicknesses $d$, the air spaces $l$, the refractive indices for the helium line $n_d$, and the Abbe figures $v_d$ are substantially as set forth in the following table:

|  | | | $n_d$ | $v_d$ |
|---|---|---|---|---|
| | $r_1=+156.40$ | | | |
| $L_1$ | | $d_1=3.80$ | 1.51680 | 64.2 |
| | $r_2=+80.54$ | $l_1=15.20$ | | |
| | $r_3=+113.70$ | | | |
| $L_2$ | | $d_2=3.80$ | 1.52054 | 69.7 |
| | $r_4=+55.43$ | | | |
| | | $l_2=39.80$ | | |
| | $r_5=+64.62$ | | | |
| $L_3$ | | $d_3=33.10$ | 1.74400 | 44.8 |
| | $r_6=+28.07$ | | | |
| $L_4$ | | $d_4=18.00$ | 1.65100 | 42.2 |
| | $r_7=-53.06$ | | | |
| $L_5$ | | $d_5=4.70$ | 1.59308 | 35.7 |
| | $r_8=+37.90$ | | | |
| $L_6$ | | $d_6=3.80$ | 1.64328 | 48.0 |
| | $r_9=+833.00$ | | | |
| | | $l_3=4.70$ | | |
| | $r_{10}=-560.00$ | | | |
| $L_7$ | | $d_7=25.10$ | 1.56873 | 63.1 |
| | $r_{11}=-23.29$ | | | |
| $L_8$ | | $d_8=2.35$ | 1.63636 | 35.3 |
| | $r_{12}=+99.50$ | | | |
| $L_9$ | | $d_9=21.80$ | 1.74300 | 33.3 |
| | $r_{13}=-66.80$ | | | |
| | | $l_4=30.80$ | | |
| | $r_{14}=-58.65$ | | | |
| $L_{10}$ | | $d_{10}=3.80$ | 1.52542 | 64.7 |
| | $r_{15}=-99.50$ | | | |
| | | $l_5=26.50$ | | |
| | $r_{16}=-58.10$ | | | |
| $L_{11}$ | | $d_{11}=4.70$ | 1.52542 | 64.7 |

$s_0'=24.05$

5. A photogrammetric objective according to claim 1 in which the radii of curvature $r$ of the lens surfaces, the lens thicknesses $d$, the air spaces $l$, the refractive indices for the helium line $n_d$, and the Abbe figures $v_d$ are substantially as set forth in the following tables:

|  | | | $n_d$ | $v_d$ |
|---|---|---|---|---|
| $L_1$ | $r_1=+163.25$ | $d_1=4.53$ | 1.51680 | 64.2 |
| | $r_2=+74.41$ | $l_1=14.14$ | | |
| | $r_3=+99.80$ | | | |
| $L_2$ | | $d_2=3.96$ | 1.52054 | 69.7 |
| | $r_4=+53.18$ | | | |
| | | $l_2=36.17$ | | |
| | $r_5=+62.21$ | | | |
| $L_3$ | | $d_3=26.82$ | 1.74400 | 44.8 |
| | $r_6=+29.33$ | | | |
| $L_4$ | | $d_4=22.80$ | 1.65100 | 41.9 |
| | $r_7=-55.22$ | | | |
| $L_5$ | | $d_5=6.80$ | 1.59308 | 35.7 |
| | $r_8=+32.50$ | | | |
| $L_6$ | | $d_6=3.00$ | 1.64350 | 47.8 |
| | $r_9=973.65$ | | | |
| | | $l_3=3.90$ | | |
| | $r_{10}=-1385.90$ | | | |
| $L_7$ | | $d_7=18.00$ | 1.55232 | 63.5 |
| | $r_{11}=-21.78$ | | | |
| $L_8$ | | $d_8=1.00$ | 1.63636 | 35.3 |
| | $r_{12}=+90.00$ | | | |
| $L_9$ | | $d_9=25.80$ | 1.74300 | 33.3 |
| | $r_{13}=-57.55$ | | | |
| | | $l_4=22.91$ | | |
| | $r_{14}=-48.76$ | | | |
| $L_{10}$ | | $d_{10}=3.96$ | 1.53375 | |
| | $r_{15}=-83.25$ | | | |
| | | $l_5=21.00$ | | |
| | $r_{16}=-51.42$ | | | |
| $L_{11}$ | | $d_{11}=10.30$ | 1.64050 | 60.1 |
| | $r_{17}=-111.90$ | | | |

$s_0'=30.8 \quad F=100.0$
$F=100.0$

* * * * *